United States Patent
Hanauska

[11] Patent Number: 5,967,405
[45] Date of Patent: Oct. 19, 1999

[54] MEGAPHONE CUP

[76] Inventor: Kenneth A. Hanauska, 5248 Hampshire Ave. North, Crystal, Minn. 55428

[21] Appl. No.: 09/157,200

[22] Filed: Sep. 18, 1998

[51] Int. Cl.$^6$ .............................. B65D 3/28; G10K 11/00
[52] U.S. Cl. ........................ 229/103; 181/178; 181/180; 229/400
[58] Field of Search .................................. 229/103, 400; 181/177, 178, 180

[56] References Cited

U.S. PATENT DOCUMENTS

| | | |
|---|---|---|
| D. 271,968 | 12/1983 | Segan et al. . |
| D. 275,438 | 9/1984 | Everson . |
| D. 283,772 | 5/1986 | Vail . |
| D. 333,409 | 2/1993 | Dietzmann . |
| 2,507,843 | 5/1950 | Wheeler . |
| 3,137,431 | 6/1964 | Crouse et al. ........................ 229/400 |
| 3,226,000 | 12/1965 | Poole et al. . |
| 3,924,795 | 12/1975 | Smith . |
| 4,125,218 | 11/1978 | DeBoer . |
| 4,613,012 | 9/1986 | Mueller, III . |
| 4,618,066 | 10/1986 | Vail . |
| 4,838,431 | 6/1989 | Sanz et al. . |
| 5,076,433 | 12/1991 | Howes . |
| 5,094,317 | 3/1992 | Ladendorf ................................ 181/178 |
| 5,501,363 | 3/1996 | Muller et al. . |

*Primary Examiner*—Gary E. Elkins
*Attorney, Agent, or Firm*—Albert W. Watkins

[57] ABSTRACT

A cup is readily converted to an acoustic megaphone by removal of the base. The paper construction, enabled by the features of the invention, offers a good printing surface and simultaneously ensures that the cup is biodegradable. In a first embodiment, a removable tape seal is used to releasably seal and retain a cup bottom to cup side walls. In a second embodiment, a more permanent seal is provided, along with a tear cord. Other embodiments illustrate pull tabs, handles, and a releasable adhesive. The base may also only be partially separated, thereby opening the cup into a horn, while still retaining the base to reduce the amount of waste paper which may become scattered.

17 Claims, 4 Drawing Sheets

MEGAPHONE CUP

BACKGROUND OF THE INVENTION

1. Field of the Invention

This invention pertains generally to acoustical intensifying horns, and more specifically to disposable cups or receptacles that are readily converted to megaphones.

2. Description of the Related art

At many diverse public events, such as political rallies, religious gatherings, award ceremonies, and entertainment events, audience participation is important to the success of the event. Through their participation, the audience can provide an ambiance conducive to a superior presentation. Furthermore, in entertainment, audience involvement is often closely related to the entertainment value. This ambiance may actually stimulate the performers to a better performance.

At sporting events, the audience encourages their favorite players or teams by shouting or chanting. This participation adds greatly to the event, and is often encouraged. In particular, at football games, basketball games, and other similar events, cheerleaders may actively direct the audience in cheers. These cheers help motivate the teams to perform at their very best level.

Nevertheless, when the size of the audience increases, each individual voice becomes harder to hear, and audience members often shout until they become hoarse or lose their voice. While each individual audience member is shouting, due to the lack of directional nature of the shout, surrounding audience members are often exposed to sounds of far greater magnitude than the performers. While this uproar is a part of the ambiance, it is also desirable for audience members to be able to focus sound more directly to the performers. Fans cup their hands to help provide direction to the voice, but the amount of improvement attained is minimal.

There are a number of devices which have been designed to help a person to focus and amplify the human voice, known as megaphones. An example of a megaphone is found in U.S. design Pat. No. 271,968 by Segan et al. Unfortunately, megaphones that include electronic amplification of the voice produce sounds deafening to adjacent audience members and so are unacceptable for use in an audience. Because the events are also frequently crowded with audience members, there is also insufficient space to set the horns down when they are not in use.

A number of horns have been designed that use only mechanical shapes to focus sound waves from the human voice and thereby provide directional amplification. These horns provide much advantage over cupping one's hands, while still not creating a deafening volume level. Nevertheless, these horns suffer from the drawbacks of requiring transport into and out of the event, and space to be set down when not in use.

Several inventors have proposed combining the megaphone into other devices, such as food and beverage receptacles, that are also commonly found at the public events. By combining the megaphone with food and beverage receptacles, the megaphone need not take up any additional space which would otherwise be reserved for the audience. Vail in U.S. Pat. No. 4,618,066 and Des. Pat. No. 283,772; Muller et al in U.S. Pat. No. 5,501,363; and Everson in Des. Pat. No. 275,438 each illustrate combined drinking cups and megaphones. Nevertheless, these devices have not gained wide acceptance at public events. One issue, related more to the event security, is the uncontrolled nature of the beverages or liquids which may be brought into the event. Another issue, related to the financial success of events, is the potential loss of revenue by the concessionaires. Yet another issue arises from individuals within the audience, who are required to transport the container into and out of the event, and then clean and store the container until needed again at some future date. Unfortunately, all too often the container remains unwashed in a vehicle trunk, prone to growth of very unpleasant microorganisms and infestations.

Mueller, III in U.S. Pat. No. 4,613,012 attempts to address several of these issues by illustrating a convertible megaphone and beverage cup holder. The Mueller device takes the form of a reuseable wrap which may hold a beverage cup, act as a megaphone, and then be laid flat when not in use. Since the Mueller construction adds materials and expenses without providing the actual functionality of a cup, the Mueller construction is designed for re-use and still requires undesirable storage and transport to and from the event.

Several alternative receptacles have been devised to provide the benefit of a megaphone without the attendant disadvantage of transport into and out of the event, and storage until the next event. Wheeler in U.S. Pat. No. 2,507,843 illustrates a popcorn or peanut holder folded from paper or cardboard stock. This food container has a perforation near the frustoconical tip which allows a person to tear off the tip, thereby converting the container to a megaphone. Similarly, Smith in U.S. Pat. No. 3,924,795 describes a frustoconical paperboard container for popcorn or peanuts, which, after the food is consumed, may be folded back to a megaphone construction. While both the Wheeler and Smith devices offer much simplicity, audience members do not always indulge in dry food. In fact, most frequently when food is purchased, beverages are also. However, the opposite is not true—many people purchase beverages without purchasing food products. Furthermore, at many events ice cream, snow cones and other frozen food is sold and is prone to melting, thereby requiring a liquid tight container. Therefore, the Wheeler and Smith inventions will not serve the greatest numbers of audience.

DeBoer addresses a number of the aforementioned limitations by disclosing in U.S. Pat. No. 4,125,218 a resin impregnated or thermoplastic cup. Due to the plastic content, the cup is liquid impervious. A small fracture line is provided in the bottom which allows a person to remove the bottom and convert the cup into a megaphone. Unfortunately, DeBoer's fracture line requires the use of high resin content, formed by blow-molding or injection molding. This type of cup is not biodegradable, and is somewhat more expensive than a similar paper cup. In addition, plastic containers frequently are more expensive and difficult to print to, and the fracture line is relatively difficult to control and initiate.

In addition to the aforementioned patent documents, many additional patents illustrate the construction of paper receptacles more generally. Among these are Poole et al in U.S. Pat. No. 3,226,000; Sanz et al in U.S. Pat. No. 4,838,431; and Howes in U.S. Pat No. 5,076,433. Each of the aforementioned patents are incorporated herein by reference for their respective teachings.

SUMMARY OF THE INVENTION

In a first manifestation, the invention is a cup convertible into a megaphone, comprising a liquid impervious side wall extending frustoconically from a smaller bottom to a larger top; an opening at the bottom blocked by a liquid impervious base fitted therein, a manually peelable means for sealing base to side wall and forming a liquid impervious seal therebetween; and a manually graspable means for separating side wall from said base to thereby facilitate removal of the sealing means from side wall.

In a second manifestation of the invention, a receptacle for containing a food substance and convertible to a megaphone comprises a main body in the shape of an acoustical horn and of diameter adequate for a human to enunciate therethrough; a means for closing the main body at a first end thereof to the passage of a liquid; a means for adhering the closure to the main body which is impervious to the passage of liquid therethrough; and a means for grasping and pulling manually; whereby the closure may be separated from body by grasping and pulling on the grasping and pulling means, thereby allowing enunciation to pass through the main body unobstructed.

OBJECTS OF THE INVENTION

A first object of the invention is to provide a paper cup of relatively low cost, simple construction, and high printability which is readily biodegradable. A second object of the invention is to enable a person to readily convert the paper cup into a megaphone. A further object of the invention is to ensure that the cup will contain liquid prior to conversion to a megaphone. Another object of the invention is to provide a relatively disposable cup that readily converts to a megaphone without undesirable littering. These and other objects of the invention may be attained in the preferred embodiment, which is best understood in conjunction with the appended drawings.

BRIEF DESCRIPTION OF THE DRAWINGS

FIG. 3 illustrates a second embodiment built in accordance with the invention, using a tear string, while

DESCRIPTION OF THE PREFERRED EMBODIMENT

Figure 1:
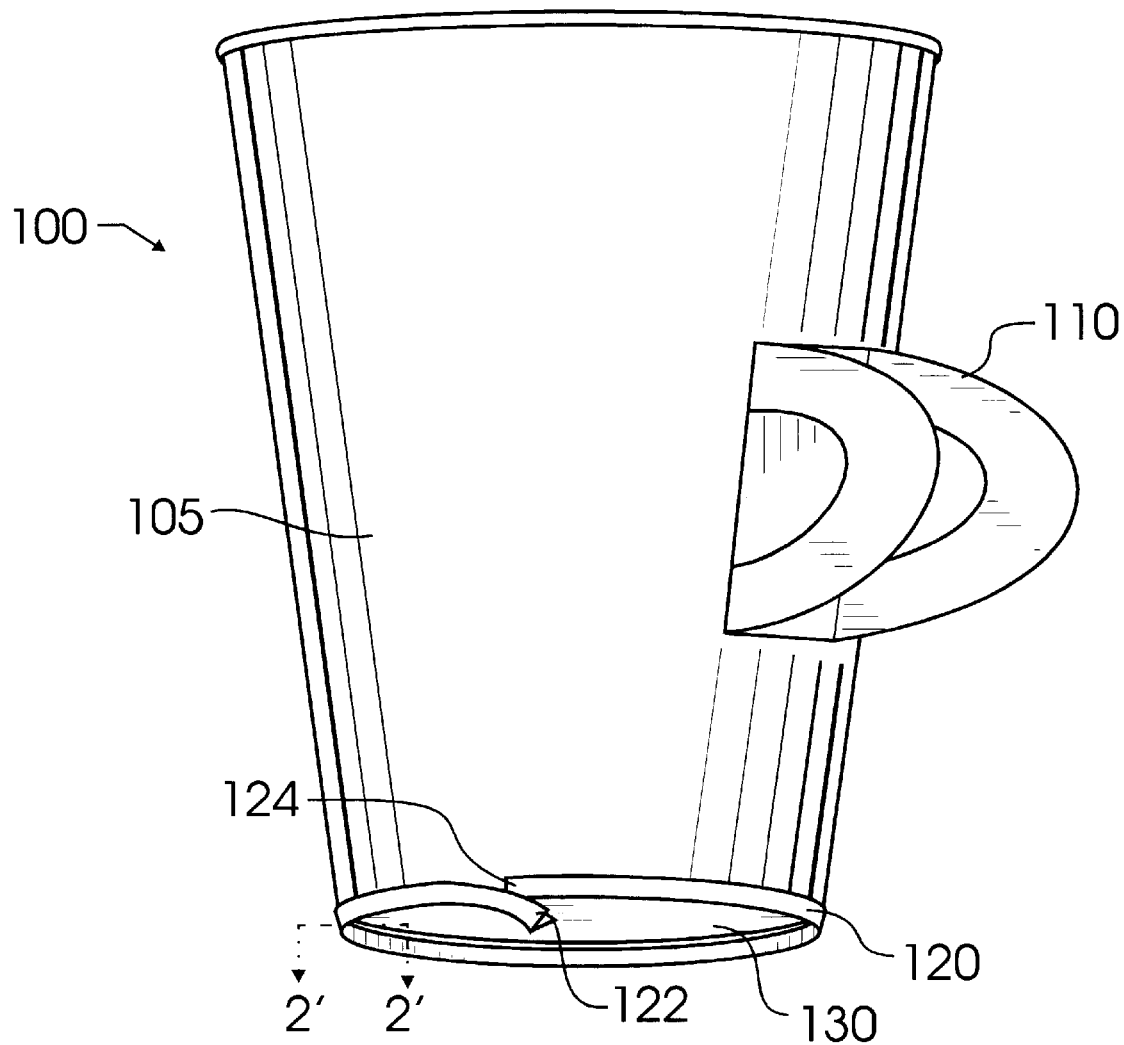
FIG. 1 illustrates a first embodiment constructed in accordance with the invention from a projected view.
Figure 2:
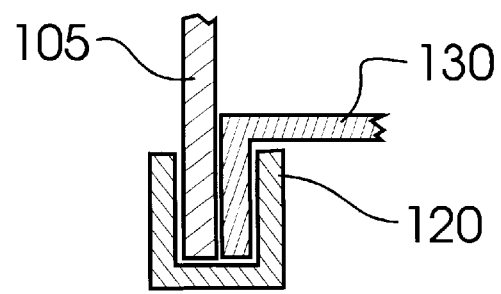
FIG. 2 illustrates the embodiment of FIG. 1 from a partial cross-section view taken along line 2' looking into the cup along the bottom rim.

In accord with the invention, a paper cup is illustrated in FIG. 1 by projected view and FIG. 2 by partial cross-section. Cup 100 includes features common to other typical paper cups known in the art, such as side wall 105 and even optional handles 110. However, base 130 of cup 100 is attached slightly differently from the prior art, to enable the separation of base 130 from side wall 105. This is best illustrated in FIG. 2, where side wall 105 and base 130 can be seen coming together and forming a flush bottom edge. Around this flush bottom edge, extending from outside of side wall 105 to a more central location than the edge of base 130 is a tear away strip 120.

Strip 120 may be manufactured from a variety of materials and include a number of different adhesives well known and available from companies such as Minnesota Mining and Manufacturing of St. Paul, Minnesota. In the preferred embodiment, this strip 120 will be formed from a material similar to side wall 105, and include a relatively waterproof or water resistant adhesive through which liquid will not readily pass. Furthermore, tear away strip 120 should be separable from side wall 105 and base 130 without excessive forces, to thereby leave side wall 105 intact after removal of strip 120 therefrom.

Returning to FIG. 1, a small starting end 122 of strip 120 is preferably masked from any adhesive, or alternatively treated in another way to reduce the adhesive strength or content in this small region. Starting end 122 may then be readily separated from opposing end 124. Once initially started, strip 120 may be readily grasped, so the remainder of strip 120 may be provided with a much better adhesive. As aforementioned, the bulk of strip 120, possibly excepting starting end 122, must be provided with a liquid tight seal to prevent leakage.

Strip 120 in this embodiment removes entirely from side wall 105, thereby fully separating tape 120 and base 130 therefrom. However, for purposes of reducing the amount of smaller, harder to retrieve litter, it is possible to provide a small dot of permanent adhesive to strip end 124, thereby diminishing the likelihood of complete removal of base 130 from side wall 105.

As also visible in FIG. 1, other features common to cups may be provided without adversely affecting the invention or altering performance in any way, such as the provision of handles 110. Reinforcing rings around the mouth of the cup may be provided, as may be covers and other similar features that may be found in the prior art of cup and megaphone construction.

Figure 3:
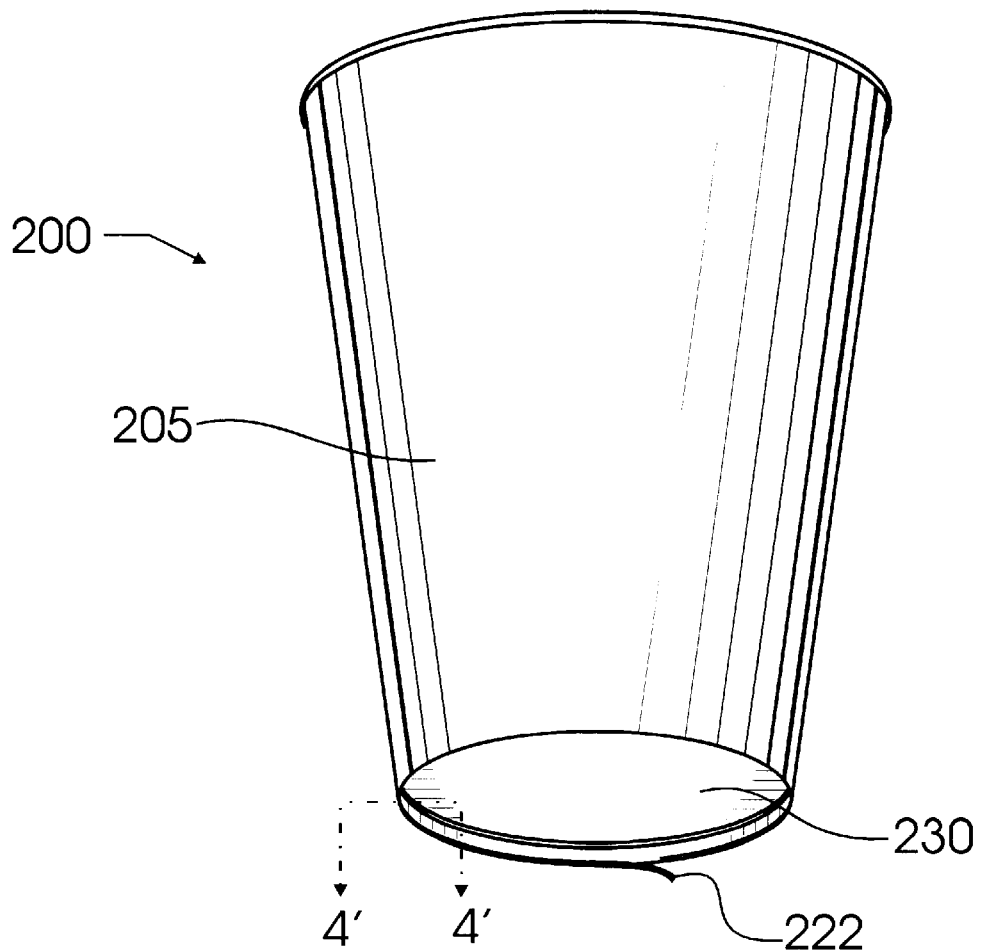
Figure 4:
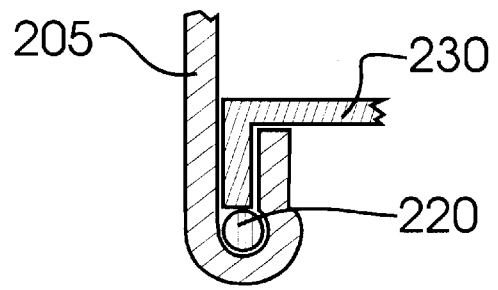
FIG. 4 illustrates the base seal of the embodiment of FIG. 3 from a partial cross section view through the cup side wall looking into the cup.

FIGS. 3 and 4 illustrate an alternative embodiment to the cup of FIGS. 1 and 2. In the embodiment of FIGS. 3 and 4 a small tear away string, filament or other similar device 220 may be provided In this embodiment, side wall 205 extends around the perimeter of base 230, wrapping to the interior perimeter where side wall 205 may be adhesively attached to base 230. In this instance, base 230 may be permanently affixed to side wall 205 using glue or other means known in the industry. Separation occurs by pulling on starting end 222 of string 220, thereby tearing through base 230 and separating base 230 from side wall 205. In cup 200, handles have not been provided, though they may be if so desired. If string 220 does not extend around the entire perimeter of base 230, a small portion of side wall 205 may still remain attached to base 230, once again reducing the number of smaller items of trash that may be generated.

Figure 5:
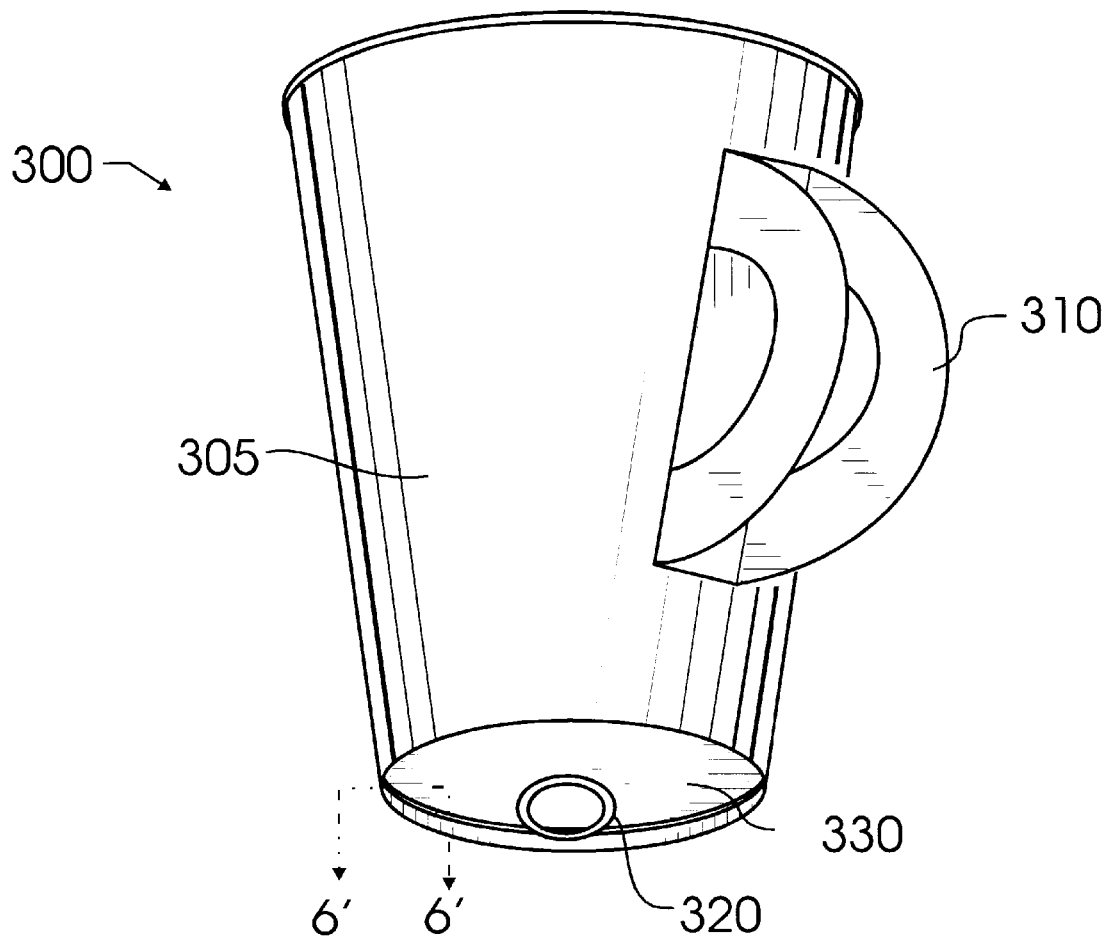
FIG. 5 illustrates a third embodiment of the invention using a pull tab formed at the base closure.
Figure 6:
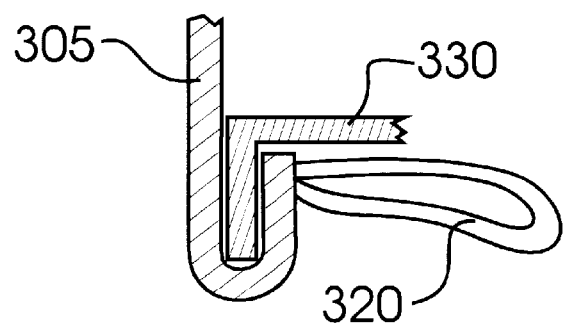
FIG. 6 illustrates the third embodiment from a partial cross-section view through the cup side wall looking into the cup.

FIGS. 5 and 6 illustrate a third alternative embodiment, this time utilizing a pull tab 320 which allows base 330 to be forcibly removed from side wall 305. In this embodiment, selection of adhesives between base 330 and side wall 305 is important to ensure the necessary water resistance and yet ensure that base 330 will still be removable from side wall 305. However, the fact that side wall 305 wraps about the outer perimeter of base 330 and extends inside the perimeter does help to ensure as much mechanical strength as possible and as long a fluid blockage route as possible independent of the adhesive. Adhesive may be applied on either the inner perimeter or outer perimeter of base 330 or both.

Figure 7:
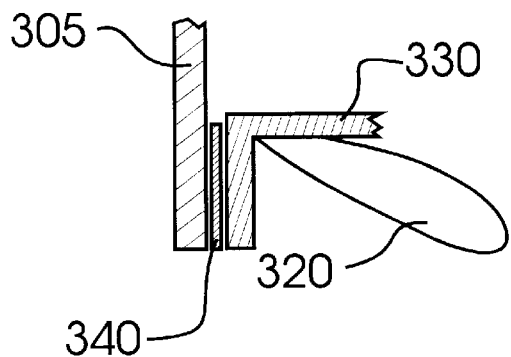
FIG. 7 illustrates an alternative base attachment to the third embodiment.
Figure 8:
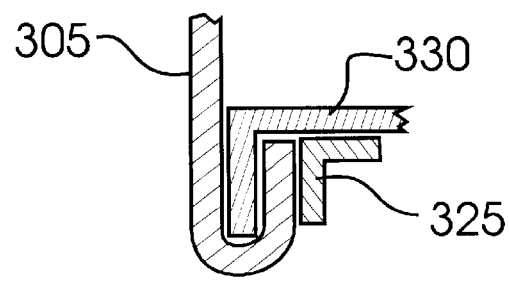
FIGS. 8 and 9 illustrate an alternative form of tape seal which may be useful in any of the various embodiments.
Figure 9:
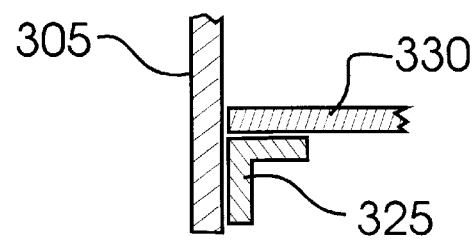

Additional alternative base seals are illustrated in FIGS. 7, 8 and 9. In FIG. 7, a simple adhesive seal 340 is illustrated which bonds base 330 to side wall 305. Pull tab 320 still performs the same function, though there is a shorter seal length. In FIG. 8, tape strip 325 is illustrated similar to the first embodiment of FIG. 1, though strip 325 may in this instance extend only along the inner periphery. FIG. 9 illustrates a further simplified seal from that of FIG. 8 relying solely on tape strip 325 to provide both mechanical and sealing functions between base 330 and side wall 305.

Any of the various attachment mechanisms illustrated herein may be adapted for any of the variety of other cup/megaphone features illustrated herein or known in the industry. In other words, as will be understood from the foregoing various embodiments, different sealing mechanisms may be utilized in combination with alternative folding techniques, and the separating structures may be adapted accordingly.

Figure 10:
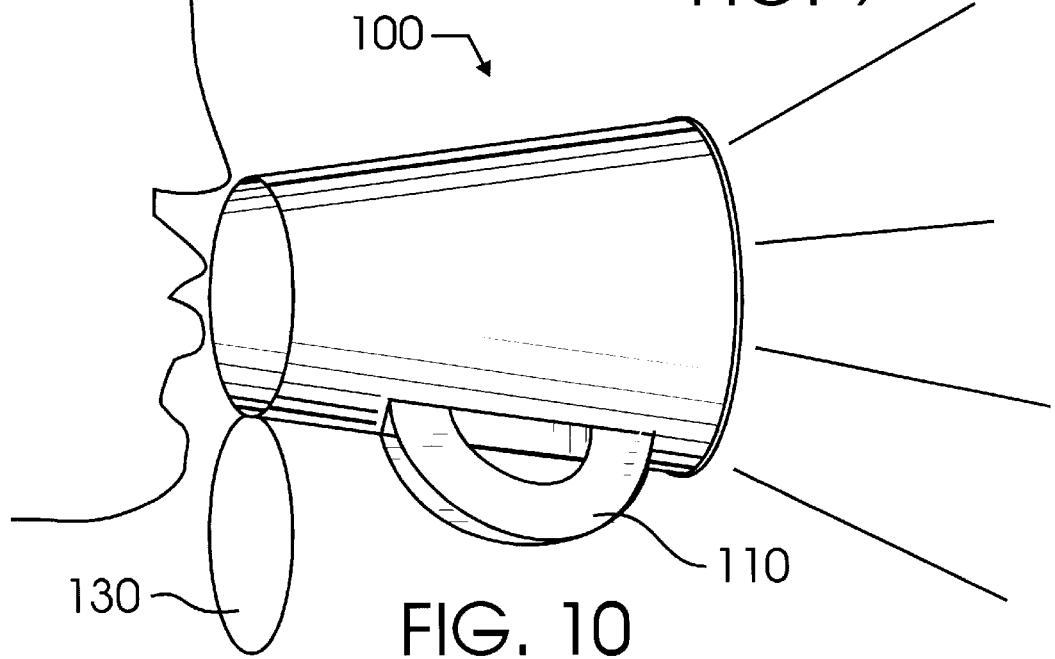
FIG. 10 illustrates the preferred usage of one embodiment of the invention as a megaphone, after the contents are emptied.

FIG. 10 illustrates the megaphone cup 100 after strip 120 has been pulled, to partially release base 130. Once base 130 has been partially released, a person may speak or cheer through the now converted megaphone cup 100. As aforementioned, base 130 may also be completely removed, if so desired and adapted, and any one of the various sealing structures could be used to accomplish either partial or complete separation of base 130.

While a variety of known materials may be well suited to many of the features of the invention, the possible use of paper is particularly noteworthy. Paper cups, which have enjoyed widespread use for many years, are readily printed, enable low cost, and biodegrade readily in the environment. Earlier inventions were not able to provide the many benefits found in the present invention, particularly when the features were attempted to be applied to paper. Paper comprises fibers which are not easily fractured, and earlier attempts such as those shown in Wheeler could easily result in total destruction of the cup, particularly where the tear does not follow a straight line. Such a misdirected tear would disable any possible megaphone application, and would not reflect favorably on the establishment or any advertisers imprinting information on the cup. Similarly, the DeBoer technology is restricted to very high plastic content. Otherwise, the fiber base will not fracture cleanly and predictably.

While the foregoing details what is felt to be the preferred embodiment of the invention, no material limitations to the scope of the claimed invention are intended. Further, features and design alternatives that would be obvious to one of ordinary skill in the art are considered to be incorporated herein. The features of the present invention are compatible with most features found in the various prior art cups and receptacles, and may further include megaphone structures known in the prior art. The scope of the invention is set forth and particularly described in the claims hereinbelow.

I claim:

1. A cup convertible into a megaphone, comprising:
   a liquid impervious side wall extending frustoconically from a smaller bottom to a larger top;
   an opening at said bottom blocked by a liquid impervious base fitted therein,
   a manually peelable means for sealing said base to said side wall and forming a liquid impervious seal therebetween; and
   a manually graspable means for separating said side wall from said base to thereby facilitate destruction of said sealing means.

2. The convertible cup of claim 1 wherein said separating means comprises an extension of said sealing means having sealing capacity reduced from the remainder of said sealing means which may be separated from an end opposite said extension manually.

3. The convertible cup of claim 1 wherein said liquid impervious side wall is comprised by paper.

4. The convertible cup of claim 1 wherein said liquid impervious base is comprised by paper.

5. The convertible cup of claim 1 wherein said sealing means comprises a liquid impervious adhesive bonding said liquid impervious base to said liquid impervious side wall.

6. The convertible cup of claim 5 wherein said base further comprises a pull tab extending therefrom connected to said base and enabling said base to be separated from said side wall manually.

7. The convertible cup of claim 6 wherein said pull tab is integral to said base.

8. The convertible cup of claim 1 wherein said separating means comprises a string extending from said base and graspable at a first end thereof.

9. The convertible cup of claim 8 wherein said string has a length which does not exceed the perimeter size of said base, thereby ensuring incomplete separation between said side wall and said base.

10. The convertible cup of claim 1 wherein said separating means comprises an adhesive strip extending about and thereby sealing a junction between said base and said side wall.

11. The convertible cup of claim 10 wherein said adhesive strip wraps about an outer perimeter of said side wall and simultaneously and continuously wraps about an inner perimeter of said base.

12. The convertible cup of claim 10 wherein said adhesive strip wraps inside an inner perimeter of said side wall and seals against a surface of said base.

13. The convertible cup of claim 1 wherein said sealing means comprises a removable and liquid resistant adhesive.

14. A receptacle for containing a food substance and convertible to a megaphone, comprising:
   a main body in the shape of an acoustical horn and of diameter adequate for a human to enunciate therethrough;
   a means for closing said body at a first end thereof to the passage of a liquid;
   a means for adhering said closing means to said body, said adhering means impervious to the passage of liquid therethrough; and
   a means for grasping and pulling manually;
   whereby said closing means may be separated from said body by grasping and pulling on said grasping and pulling means, to thereby allow said enunciation to pass through said main body unobstructed.

15. A method of converting a liquid-impervious container having a side wall and a base into an acoustical horn, comprising the steps of:
   grasping and pulling a handle;
   breaking a liquid-impervious seal between said side wall and said base; and
   separating said base from said side wall to open a passage between said base and said side wall which extends through said container.

16. The method of claim 15 wherein said separating between said base and said side wall is incomplete, leaving said base partially attached to said side wall.

17. The method of claim 15 wherein said separating between said base and said side wall is complete, fully detaching said base from said side wall.

* * * * *